United States Patent
Chen et al.

(10) Patent No.: US 9,824,243 B2
(45) Date of Patent: Nov. 21, 2017

(54) MODEL-BASED RUNTIME DETECTION OF INSECURE BEHAVIOR FOR SYSTEM ON CHIP WITH SECURITY REQUIREMENTS

(71) Applicant: Freescale Semiconductor, Inc., Austin, TX (US)

(72) Inventors: Wen Chen, Austin, TX (US); Jayanta Bhadra, Austin, TX (US); Lawrence L. Case, Austin, TX (US)

(73) Assignee: NXP USA, INC., Austin, TX (US)

( * ) Notice: Subject to any disclaimer, the term of this patent is extended or adjusted under 35 U.S.C. 154(b) by 118 days.

(21) Appl. No.: 14/851,861

(22) Filed: Sep. 11, 2015

(65) Prior Publication Data

US 2017/0076116 A1    Mar. 16, 2017

(51) Int. Cl.
*G06F 21/85* (2013.01)
*G06N 99/00* (2010.01)

(52) U.S. Cl.
CPC ........... *G06F 21/85* (2013.01); *G06N 99/005* (2013.01)

(58) Field of Classification Search
CPC ..... G06F 21/85; G06F 99/005; G06N 99/005; H04L 63/08; H04L 9/3268
See application file for complete search history.

(56) References Cited

U.S. PATENT DOCUMENTS

| | | | |
|---|---|---|---|
| 7,401,234 B2 | 7/2008 | Case et al. | |
| 7,519,998 B2 | 4/2009 | Cai et al. | |
| 7,555,777 B2 | 6/2009 | Swimmer et al. | |
| 2003/0140039 A1* | 7/2003 | Ferguson | G06K 9/00503 |
| 2012/0290879 A1* | 11/2012 | Shibuya | G06N 99/005 714/26 |
| 2014/0053260 A1* | 2/2014 | Gupta | G06F 21/50 726/22 |
| 2014/0252487 A1 | 9/2014 | Stephens et al. | |
| 2014/0317734 A1* | 10/2014 | Valencia | G06F 21/552 726/22 |
| 2015/0135153 A1* | 5/2015 | Zhou | G06F 17/5068 716/113 |
| 2015/0169393 A1* | 6/2015 | Shibuya | G06F 11/00 702/182 |
| 2015/0286819 A1* | 10/2015 | Coden | G06F 21/552 726/23 |
| 2015/0317475 A1* | 11/2015 | Aguayo Gonzalez | G06F 21/55 726/23 |

(Continued)

OTHER PUBLICATIONS

Ashish Tiwari et al., Safety Envelope for Security, Proceedings of the 3rd International Conference on High Confidence Networked Systems (HiCoNs '14) ACM, Berlin, pp. 85-94 csl.sri.com/users/dejan/papers/tiwari-hicons2014.pdf.

(Continued)

*Primary Examiner* — Hosuk Song
*Assistant Examiner* — J. Brant Murphy

(57) ABSTRACT

A runtime classifier hardware circuit is incorporated into an electronic device for implementing hardware security by storing a support vector model in memory which is derived from pre-silicon verification data to define secure behavior for a first circuit on the electronic device; monitoring input and/or output signals associated with the first circuit using the runtime classifier hardware circuit which compares the input and/or output signals to the support vector model to detect an outlier input signal and/or outlier output signal for the first circuit; and blocking the outlier input and/or output signal from being input to or output from the first circuit.

18 Claims, 7 Drawing Sheets

(56) References Cited

U.S. PATENT DOCUMENTS

| | | | | |
|---|---|---|---|---|
| 2016/0012228 | A1* | 1/2016 | Sethumadhavan | G06F 21/71 726/23 |
| 2016/0042283 | A1* | 2/2016 | Kelly | G08B 13/19 706/12 |
| 2016/0180068 | A1* | 6/2016 | Das | G06F 21/32 726/7 |
| 2017/0015339 | A1* | 1/2017 | Jia | G06F 17/50 |
| 2017/0024660 | A1* | 1/2017 | Chen | G06N 99/005 |

OTHER PUBLICATIONS

Kevin M. Irick et al., A Hardware Efficient Support Vector Machine Architecture for FPGA, IEEE 16th International Symposium on Field-Programmable Custom Computing Machines, pp. 304-305, 2008.

Lin Tan et al., A High Throughput String Matching Architecture for Intrusion Detection and Prevention, Proceedings of ISCA, 2005.

Markos Papadonikolakis et al., A Novel FPGA-based SVM Classifier, IEEE pp. 283-286, International Conference on Field-Programmable Technology (FPT), 2010.

Yogita B. Bhavsar et al., Intrusion Detection System Using Data Mining Technique: Support Vector Machine, International Journal of Emerging Technology and Advanced Engineering, www.ijetae. com (ISSN 2250-2459, ISO 9001:2008 Certified Journal, vol. 3, Issue 3, Mar. 2013), pp. 581-586.

Chongxi Bao et al., On Application of One-class SVM to Reverse Engineering-Based Hardware Trojan Detection, 15th International Symposium on Quality Electronic Design (ISQED), Mar. 3-5, 2014.

Freescale Semiconductor, Inc., Review Draft—Chapter 1, Resource Domain Controller (RDC), pp. 1-39, 2014.

Zbynek Michlovsky et al., String Kernel Based SVM for Internet Security Implementation, ICONIP 2009, Part II, LNCS 5864, pp. 530-539, 2009, Springer-Verlag Berlin Heidelberg 2009.

Ozgur Yilmzael et al., Leveraging one-class SVM and semantic analysis to detect anomalous content, (2005). Center for Natural Language Processing, Paper 7., http://surface.syr.edu/cnlp/7.

\* cited by examiner

MODEL-BASED RUNTIME DETECTION OF INSECURE BEHAVIOR FOR SYSTEM ON CHIP WITH SECURITY REQUIREMENTS

BACKGROUND OF THE INVENTION

Field of the Invention

The present invention is directed in general to integrated circuit device security operation and design. In one aspect, the present invention relates to a method, computer program element, and apparatus for providing security assurance in a data processing system.

Description of the Related Art

With increasing use and interaction of computers and networks, security risks have been identified to be an industry-wide issue for the design and operation of computer systems. For example, sensitive security information that is stored on-chip may be protected by a security block, but this information can still be vulnerable due to security holes. Improper access, overwrites or a complete loss of information is possible by running malicious software, inducing faults and/or using a chip's test and debug interfaces to create unforeseen scenarios to attack an authentication or an encryption block in unexpected ways and thereby obtain unauthorized access to the security information. The prevention of unauthorized access to secure information remains a big challenge due to missing or incomplete specifications of how security blocks can be made vulnerable. This is due to the fact that chip manufacturers or security IP providers do not publish or spec out the circumstances under which a given security block can be compromised, rendering existing security verification processes fundamentally incomplete. As a result, the existing verification and design solutions make the detection and prevention of unauthorized access to sensitive security information extremely difficult at a practical level.

BRIEF DESCRIPTION OF THE DRAWINGS

The present invention may be understood, and its numerous objects, features and advantages obtained, when the following detailed description is considered in conjunction with the following drawings.

DETAILED DESCRIPTION

A method and apparatus are described for detecting and preventing attacks by using functional verification data to generate a model of security-adhering behavior which is used on chip by an SVM classifier during chip operation (a.k.a., runtime classifier). The runtime classifier indicates unexpected behavior (i.e., anomalies) to an on-chip security monitor. The security monitor may provide a security response to the system based on the anomalies and violations it receives. Various problems in the art where limitations and disadvantages of conventional solutions and technologies will become apparent to one of skill in the art after reviewing the remainder of the present application with reference to the drawings and detailed description provided herein. In selected embodiments, pre-silicon functional verification data of a selected security block is selectively extracted from RTL and gate-level simulation traces to define a behavior space in which the mechanism implementing the policy decision point acts in accordance with security policies. The extracted verification data is applied as a training dataset of feature vectors to a learning engine, such as an SVM training module, to build an SVM model capturing the boundary of the space covered by the training dataset. The SVM model includes the important samples on the boundary (noted as support vectors) with associated weights, and may be used to create a runtime classifier that monitors circuit behavior and flags patterns of bad behaviors by computing an outlier measure which identifies behavior that departs from the boundary by a specified threshold. By instrumenting the integrated circuit device to include the SVM model and runtime classifier, insecure circuit behavior can be flagged in the instrumented integrated circuit device during chip operations. In selected embodiments, the SVM security model that is stored on chip can be updated with the model derived from additional post-silicon training data to improve the model accuracy or shift the boundary space based on real applications.

Figure 1:
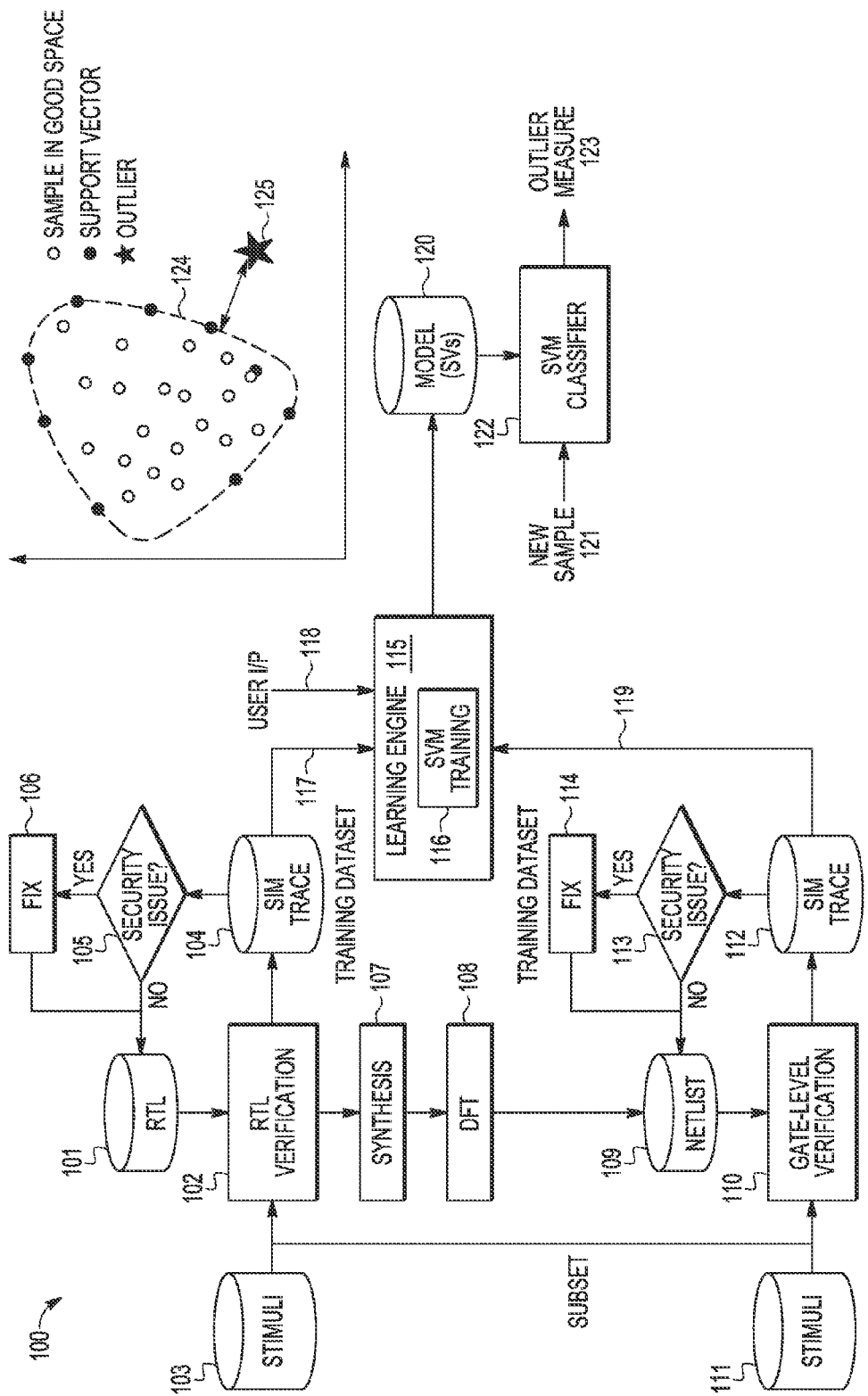
FIG. 1 illustrates a simplified design flow chart for deriving a security model from pre-silicon verification data generated during the verification process of an integrated circuit device in accordance with selected embodiments of the present invention.

Referring to FIG. 1, there is a simplified design flow chart for the design steps 100 for deriving a security model from pre-silicon verification data generated during the design and verification of an integrated circuit (IC) device. Generally speaking, the IC design process encompasses logic and circuit design through increasing levels of specificity, including test and verification steps, and typically involves several steps, including an architectural design exploration and die size estimation; function analysis; system level design; analog design, simulation and layout; digital design, simulation and synthesis; system simulation and verification; design for test and automatic test pattern generation;

design for manufacturability; and additional steps for fabricating, testing, packaging the design into a physically integrated circuit device. In FIG. 1, the depicted design steps are illustrated with reference to an electronic design automation (EDA) design flow wherein functioning circuit design (e.g., an RTL description) is converted to a gate-level description (netlist) that may be used by placement and routing tools to create a physical layout for the fabrication of the IC device.

In selected embodiments, the functioning circuit design 101 is provided as an input to a design process that is provided by an IP provider, a core design team, or other design company, or from other sources. The functioning circuit design may be provided in the form of a register-transfer-level (RTL) abstraction of the IC design as a hardware description language (HDL)—such as Verilog, VHDL, or the like—to create high-level representations of the IC, and may be tangibly contained on one or more machine readable medium as human readable code.

At the RTL verification process 102, a circuit simulation step is performed to simulate the IC design. While any desired circuit simulator may be used, in selected embodiments, stimulus 103 is provided to the RTL verification environment 102 which conducts an RTL function simulation of the IC design to check whether or not the expected function can be obtained with the RTL description of the IC design. At a minimum, the stimuli 103 are run at the RTL verification step 102 to verify that security policies are well observed. The simulation results from the RTL stimulus are stored in memory as simulation trace data 104. If the circuit simulation of the IC design determines that the description of the functioning circuit design does not provide the expected security function (affirmative outcome to step 105), then the RTL design is corrected and revised at step 106. Otherwise, the IC design passes the RTL circuit simulation test (negative outcome to security issue test step 105), and the design method proceeds to perform logic synthesis of the RTL description to create a netlist of the IC design.

In selected example embodiments, a logic synthesizer 107 may use an RTL description of the IC design to synthesize, or translate, the IC design into a netlist to define a list of wires, transistors, logic gates, control circuits, I/O, etc., that describe the connections to other elements and circuits in an IC design and recorded on at least one of machine readable medium. As will be appreciated, the process of generating a netlist may include a design for testing (DFT) step 108 to insert certain testability features to the hardware product design. In addition, the logic synthesis and DFT processing may be an iterative process in which the netlist is resynthesized one or more times depending on design specifications and parameters for the circuit. The resulting netlist description of the component terminals and connectivity of the IC design are stored 109.

At the gate-level verification step 110, logic simulation is performed to verify the logic of the netlist description of the IC design, including the inserted DFT testability features. While any desired logic simulator may be used, in selected embodiments, a verification technique can be used to verify that the logic of the netlist description can function as expected. At a minimum, a selected subset of gate-level stimuli 111 are run at the gate-level verification step 110 to verify at the gate level that the netlist with inserted DFT testability features do not break security policy. The simulation results from the gate-level stimulus are stored as simulation trace data 112. If the simulation of the IC design determines that the netlist description of the IC design does not provide the expected security function (affirmative outcome to security issue test step 113), then the netlist design description is corrected and revised at fix step 114. Otherwise, the IC design passes the netlist circuit simulation test (negative outcome to security issue test step 113), and the design method may proceed with subsequent design and fabrication steps (not shown).

As described above, security verification may be conducted at both the RTL level and gate-level (after DFT insertion) by running stimuli 103 to at the RTL verification step 102 to verify that security policies are well observed and also running at least a subset of the stimuli 111 at gate level to verify that the inserted DFT circuitry does not break the security policy. In operation, the verification is conducted by running stimuli that might break security policies and then accumulating the RTL and gate-level simulation traces, though this approach alone is not sufficient to ensure complete verification.

To address this deficiency with conventional design and verification, the RTL and gate-level simulation traces stored 104, 112 as verification data may be used to generate a model of security-adhering behavior for specified security blocks in the IC design. To this end, the captured verification data may be provided to a learning engine 115 as RTL trace verification data 117 and gate-level trace verification data 119 under control of a user input 118 which is configured to learn the security-adhering or "good" behavior for each security block by generating a model 120 which may be used to predict insecure behavior. In cases where there are no detailed specifications for a security block in the IC design, the accumulated stimuli and simulation traces 117, 119 are valuable because they implicitly define the good behavior space in which security policies are adhered to, and can therefore be used by the learning engine 115 to train the model 120 which captures the space of the good behavior, thereby defining the behavior outside this space that is likely to be insecure.

As disclosed herein, the learning engine 115 may employ any desired computational learning mechanism that is configured to recognize and learn behaviors so as to identify and distinguish between normal and abnormal behavior. However, in selected embodiments, the learning engine 115 may employ a support vector machine (SVM) training algorithm 116 which uses learning algorithms to analyze data and recognize patterns for use in classification and regression analysis. In operation, the SVM training algorithm 116 receives the RTL trace verification data 117 and gate-level trace verification data 119 as training examples under control of the user input 118 during a training phase. Given a set of training examples 117, 119, the SVM training algorithm 116 builds a support vector model 120 using a linear or non-linear probabilistic classifier. More generally, the training phase applies the training dataset 117, 119 to build the support vector model 120 which captures the boundary of the space covered by training dataset 125. The resulting SV model 120 includes at least the important samples on the boundary (support vectors) with associated weights, where the sample are represented as points in space 124 which are mapped and analyzed to identify the boundary 125 of samples which bound the "good space" samples 124.

Using the support vector model 120, an SVM classifier 122 is provided to evaluate new samples 121 representing security block behavior to decide whether a new sample 121 falls in the space captured by the model 120 or not. In operation, the SVM classifier 122 may be designed as a runtime classifier for mapping the new samples 121 into the model sample space to flag the new sample 121 as representing good or bad behavior based on which side of the support vector boundary 125 the new sample falls on. For example, the SVM classifier 122 may leverage a one-class SVM algorithm to detect anomalous access requests to a security block during chip operation by including the SVM classifier 122 and model 120 in the IC design. To decide if a new sample (e.g., 126) falls in the space bounded by the support vectors 125 of the model 120, the SVM classifier 122 may be configured to compute an outlier measure 123 for the new sample 126. Generally speaking, an outlier measure $O_M$ may be computed in SVM one-class as $O_M = (\Sigma_{i=1}^n \alpha_i k(s_i,t))+b$, where i is an index value, n is the number of support vectors, $s_i$ is the indexed support vector, $\alpha_i$ is the associated vector weight, t is the new sample, k is the kernel function which measures the similarity of the sample terms $s_i$, t, and b is a bias or threshold adjustment term. In an example embodiment, the kernel function k is $<s_i, t>$ may be computed as the inner dot product of the terms $s_i$ and t. In this example computation algorithm, if $O_M<0$, then the new sample 126 is an outlier.

Figure 2:
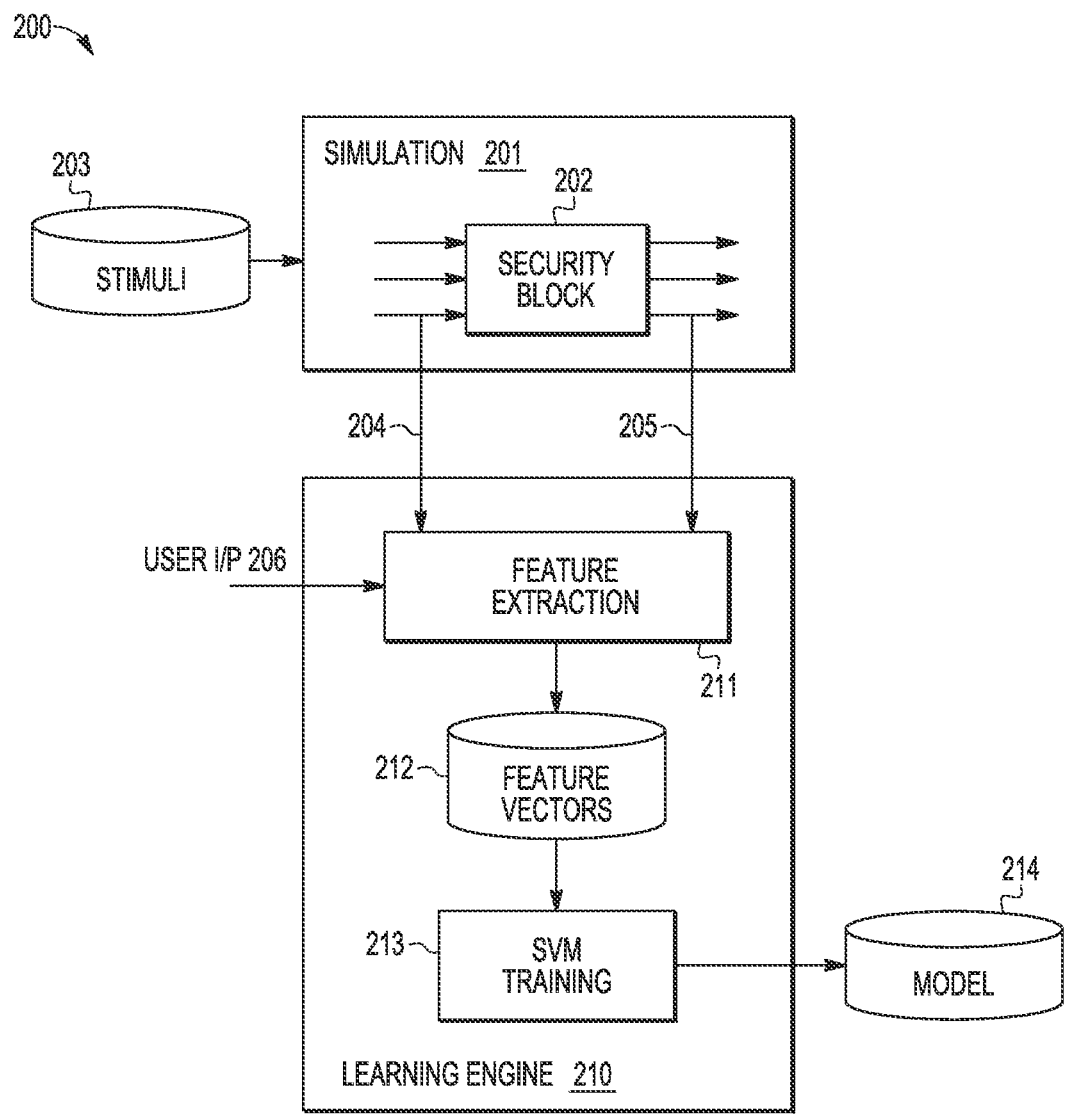
FIG. 2 illustrates a simplified schematic block diagram of a security model generation system which selectively applies extracted input/output signal traces as feature vectors to a learning engine to output a security model based on Support Vector Machine (SVM) in accordance with selected embodiments of the invention.

Referring now to FIG. 2, there is a simplified schematic block diagram of a security model generation system 200 for modeling the secure behavior of a security block 202 using pre-silicon verification data captured from the simulation 210 of the security block 202. During simulation 201 of the IC design, the received stimulus data 203 may include RTL stimuli (and gate-level stimuli) for a security block 202 portion in the IC design. During simulation, a learning engine 210 selectively captures input/output signal traces 204, 205 of the security block 202 to generate an SVM model 213 of the secure behavior for the security block 202. In an example embodiment, the learning engine 210 includes a feature extraction unit or module 211 which is configured to extract values of selected input signals 204 and/or output simulation traces 205 or even internal signals from the security block 202 for encoding into feature vectors 212. The extracted feature vectors 212 are applied as a training dataset to an SVM learning engine 213, which may be an off-the-shelf SVM training software, such as libSVM. Based on the feature vector training examples, the SVM training engine 213 outputs a model 214 of support vectors $s_i$ with respective weights $\alpha_i$. The training process can be carried out offline by software.

In selected embodiments, a user input selection control 206 may be provided to the feature extraction process 211 to specify which input/output signal traces 204, 205 are captured. The user input selection control 206 enables flexible selection of input/output signal traces 204, 205 to be consistent with the input/output signals that are monitored during chip operation. In addition, the user input selection control 206 allows the internal signals or output signals of the security block to be monitored and selected to improve learning resolution of the learning engine 210. As will be appreciated, the selection of input/output signals by the user input selection control 206 will affect how the model 214 is generated, as well as the design and operation of the classifier that is used during chip operation to monitor circuit behavior using the model 214 as described more fully below.

Upon completing the training process of applying verification trace data 203 to the learning engine 210, the resulting model 214 effectively captures or defines the security-adhering behavior of the security block 202. By comparing the "good behavior" model 214 with monitored circuit behavior of the security block 202 during chip operation, insecure behavior of the security block 202 can be detected. To enable this comparison, the model 214 may be used by a runtime classifier that monitors circuit behavior and flags patterns of bad behaviors. As will be appreciated, the runtime classifier may be implemented on-chip with hardware or software as part of a wrapper on top of the security block to monitor its runtime input/output behavior and prevent the security block from executing insecure inputs and/or block insecure outputs. In an example hardware implementation, the support vector model 214 may be loaded in on-chip memory (e.g., ROM) and runtime classifier may be implemented on-chip as a vector processing unit. In a software implementation, every time the security block receives a transaction, an interrupt service routine is called to read the signal vector and run the runtime classifier.

Figure 3:
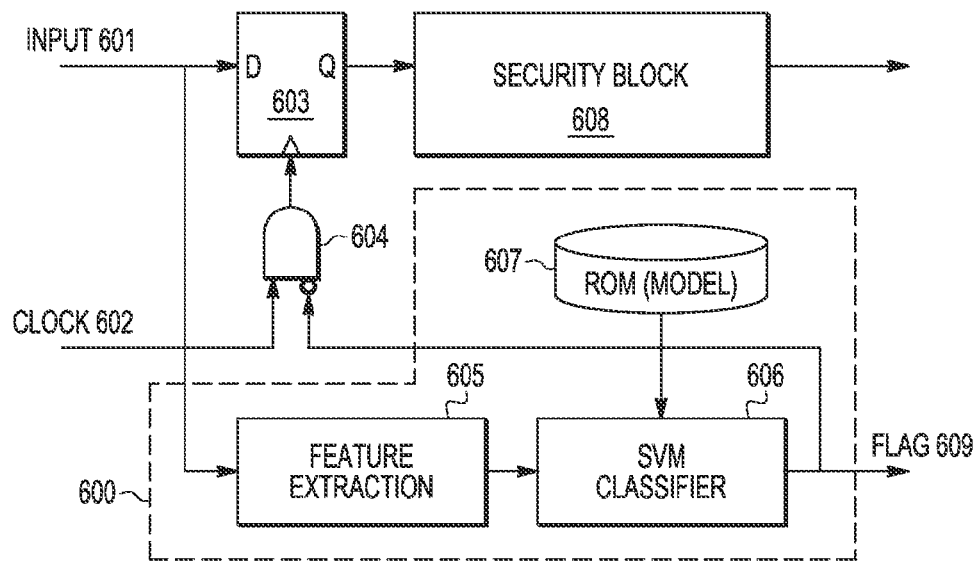
FIG. 3 illustrates a simplified schematic block diagram of a runtime detector using an SVM security model to preemptively classify and prevent unauthorized accesses to a security block in accordance with selected embodiments of the invention.

In accordance with the present disclosure, the model-based security wrapper can be implemented in a variety of hardware design styles to perform runtime classification and prevention of unauthorized accesses to a security block. For example, FIG. 3 shows a simplified schematic block diagram of a security block 608 which is wrapped by a runtime detector 600 and associated front-end response circuitry 603, 604 which preemptively classify and prevent unauthorized accesses to a security block 608 by capturing inputs 601 before execution at the security block 608. In this configuration, the original input signals 601 to the security blocks are latched by flip-flop 603 before passing through to the security block 608. The original clock signal 602 is gated by the flag signal 609 generated by the SVM classifier 606 using a logic gate 604 (e.g., AND gate) which logically combines a first clock signal 602 and flag signal 609 generated by the SVM classifier 606. To control the flag signal 609, the runtime detector 600 includes a feature extraction unit 605, SVM classifier 606, and SVM model 607 which are connected to monitor the input transactions 601 by extracting the relevant feature vector from sample signals at feature extraction unit 605, and then applying the extracted feature vector to the SVM classifier 606 based on the SVM model stored in ROM 607. If the SVM classifier 606 detects an abnormal input (e.g., by computing an outlier measure that meets a threshold requirement), the flag signal 609 input to the logic gate 604 preemptively blocks the input data 601 from being passed into the security block 608. In addition, the flag signal 609 may be logged or stored with the flagged input 601 for subsequent analysis. In this configuration, only the input signals to the security block 608 need to be monitored.

Figure 4:
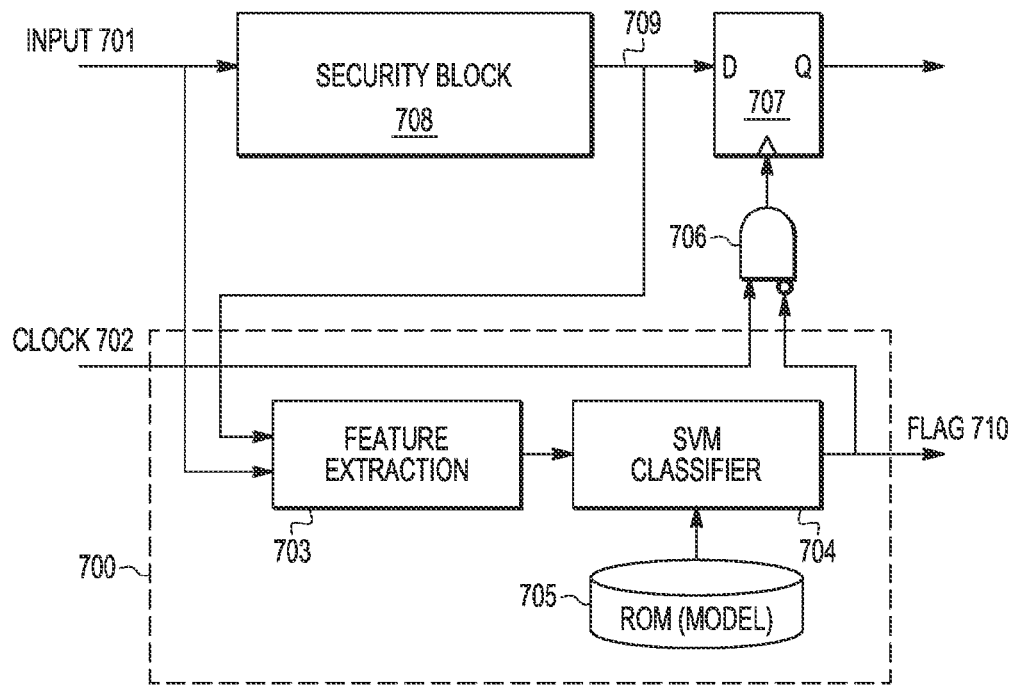
FIG. 4 illustrates a simplified schematic block diagram of a runtime detector using an SVM security model to reactively classify and block abnormal outputs from a security block in accordance with selected embodiments of the invention.

In another example embodiment, there is shown in FIG. 4 a simplified schematic block diagram of a security block 708 which is wrapped by a runtime detector 700 and associated back-end response circuitry 706, 707 which reactively classify and block abnormal outputs from the security block 708 by capturing inputs 701 and outputs 709 of the security block 708. In this configuration, the output signals 709 from the security block 708 are latched by flip-flop 707 before passing through to the output. The clock signal 702 is gated by the flag signal 710 generated by the SVM classifier 704 using logic gate 706 (e.g., AND gate) which logically combines a clock signal 702 and flag signal 710 generated by the SVM classifier 704. To control the flag signal 710, the runtime detector 700 includes a feature extraction unit 703, SVM classifier 704, and SVM model 705 which are connected to monitor the input transactions 701, output transactions 709, and/or internal signals by extracting therefrom the relevant feature vector at feature extraction unit 703, and then applying the extracted feature vector to the SVM classifier 704 based on the SVM model stored in ROM 705. If the SVM classifier 704 detects an input causing abnormal behavior (e.g., by computing an outlier measure that meets a threshold requirement), the flag signal 710 input to the logic gate 706 effectively blocks the output signal 709 from being propagated to the memory or other parts of the system from the security block 708. In this way, an input 701 causing abnormal behavior can get executed by the security block 708, but the resulting output 709 will be blocked and a message may be sent out to the security monitor (e.g., 502) to deal with it. For example, the flag signal 710 may be logged or stored with the flagged input 701, flagged output 709 and/or internal signals for subsequent analysis. For a critical security block 708, the states of the security block 708 can be periodically backed up and then restored when abnormal behaviors are detected. The backup and recovery be realized by a variety of mechanisms which are not shown here. In this example embodiment of the reactive approach, the SVM model 705 can be trained based on extracted information from input and output or even internal signals. Since more relevant information can be extracted to train the model, it can provide more resolution than the preemptive approach depicted in FIG. 3.

As indicated above, once the SVM model of the security block is derived from SVM training, it may be stored on-chip and used by a runtime classifier. The runtime classifier, based on the SVM model combined with other auxiliary circuitry, acts as a detection and prevention wrapper on top of the security block to monitor its runtime input/output behavior and prevent the security block from executing insecure inputs and/or block insecure outputs. As will be appreciated, the runtime classifier may be implemented as general SVM classifier hardware structure which loads the SVM model as programmable parameters. Alternatively, the classifier could be implemented in software running on the processor with hardware support to send an interrupt trigger and corresponding extracted signal traces to the processor and return the classification results from the processor. Both hardware and software implementation of the SVM classifier would require other auxiliary hardware support for preemptively preventing abnormal inputs or reactively blocking abnormal outputs described herein.

Figure 5:
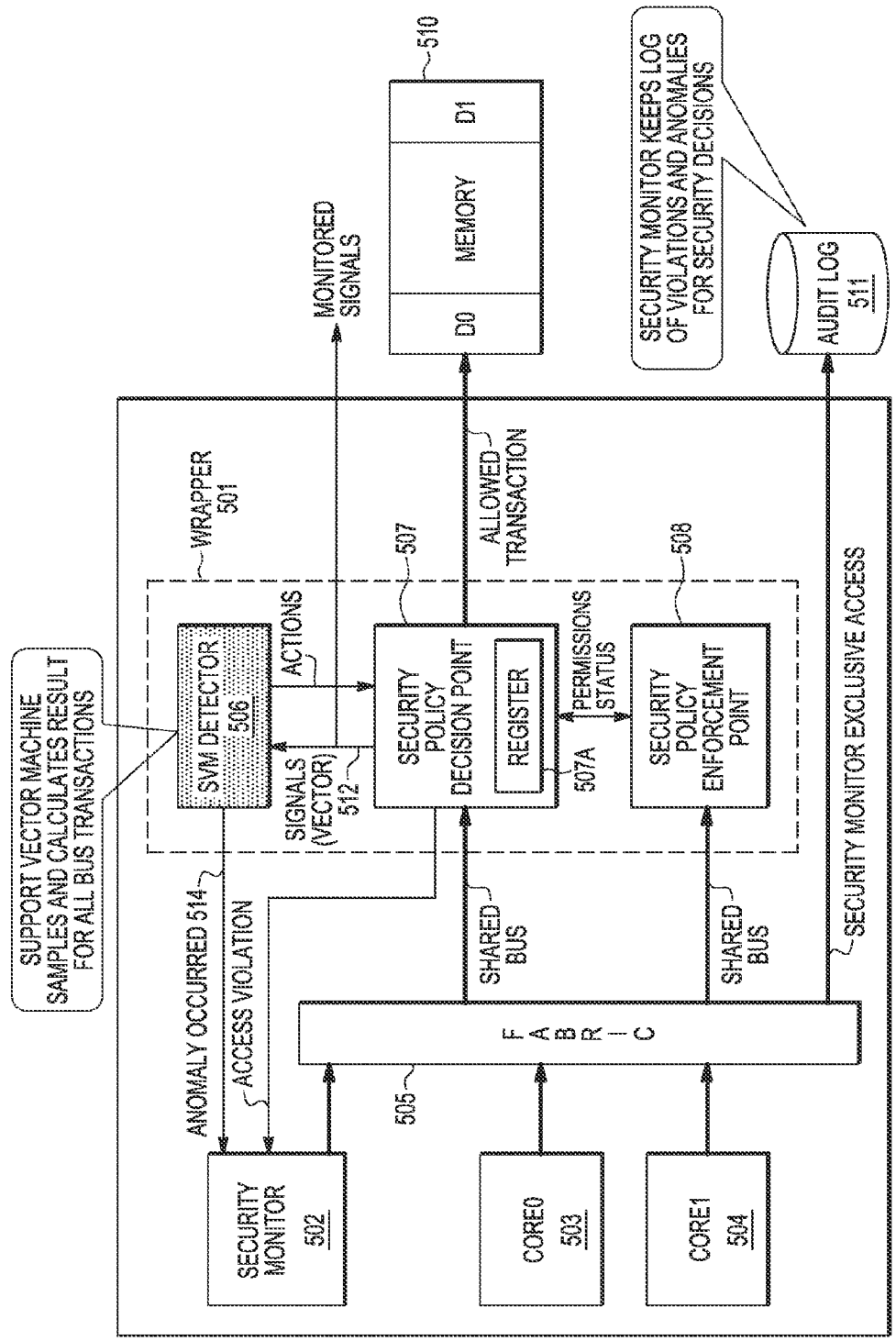
FIG. 5 illustrates a simplified schematic block diagram of an SVM security model wrapper integrated on chip for detecting and preventing unauthorized access to a security block which may result in unauthorized access to regions in memory in accordance with selected embodiments of the invention.

To illustrate an example of such an arrangement, reference is now made to FIG. 5 which shows a simplified schematic block diagram of a system on chip (SOC) 500 with a SVM security model wrapper 501 integrated on chip for detecting and preventing unauthorized access to a security policy decision point (PDP) module 507. While SOC 500 may include any number and variety of different components integrated on a single chip, the illustrated example includes a plurality of processor cores 503-504 (e.g., Core0 and Core1) connected with a security monitor 502 across a connection fabric 505 to a security policy decision point module 507 and a security policy enforcement point (PEP) module 508. The security policy decision point module 507 acts as a security gasket to control access to certain memory regions (e.g., D0, D1) in memory 510 so that each processor core (e.g., Core0 503) is only permitted access to a corresponding memory region (e.g., D0). To this end, the security policy enforcement point module 508 may provide a mechanism to allow boot time configuration code to assign cores, bus masters, peripherals and memory regions to domain identifiers. Once configured, bus transactions are monitored by the security policy decision point to restrict accesses initiated by cores and bus masters to their respective peripherals and memory. Upon each transaction, the PDP 507 communicates with PEP 508 and reads permission information and updates its internal state which is stored in register 507A. In addition, the PDP 507 makes decisions about whether a transaction can get access based on its state. In the event that an access attempts to violate the security policy, the PDP 507 captures the information about the offending transaction and notifies the security monitor 502. The security monitor 502 can go through PEP 508 to read or modify the state of PDP 507, which indicates the information of the offending transaction. The security monitor can record the address of the violating attempt in the audit log database 511 which the security monitor 502 uses to keep a log of violations. When the security monitor is modifying the state of PDP 507 via the PEP 508, there may be circumstances where another bus transaction attempts to violate the security policy simultaneously. In some rare circumstances, these two accesses together could create an unexpected glitch that compromises the state of PDP 507 and lets the bus transaction get unauthorized access to the sensitive information in the memory. This is not uncommon in practical design verification process. In verification, two access mechanisms alone can be verified thoroughly. However, the coincidence of the two access mechanisms is usually hard to verify completely due to the complexities and limited simulation resources.

To protect against such situations and other improper operations or attacks, the SVM security model wrapper 501 may be included in the SOC 500 to monitor the input/output behavior of the security policy decision point module 507 and security policy enforcement point module 508 to prevent execution of insecure inputs and/or to block insecure output. As illustrated, the wrapper includes a runtime detector 506 which uses an SVM model (not shown) to control response circuitry, such as front-end and/or back-end response circuitry which may be located in the security policy decision point module 507 and/or security policy enforcement point module 508. Connected to monitor the traffic of security policy decision point 507, the runtime detector 506 is connected to receive selected signals 512, and may also be connected to the SVM model to receive a plurality of support vectors as input parameters which were formed by applying a training set of a plurality of feature vectors extracted from pre-silicon verification simulation traces to SVM training engine. Wherever implemented, the SVM model may be used to classify a set of signal vectors 512 that reveals the issue in the security policy decision point module 507 by computing an outlier measure to identify the offending vector and indicate to the security monitor 502 that an anomaly occurred with signal 514. In a hardware implementation, the SVM model may be loaded on-chip in ROM memory and the SVM detector 506 may be implemented as a vector processing unit or other dedicated hardware processing circuitry. Alternatively, a software implementation may be used such that, every time the security policy decision point module 507 receives a transaction, an interrupt service routine is called to read the signal vector and run the classification tasks on the processor.

As will be appreciated, the use of an SVM model to characterize transactions as security-adhering or insecure can result in "false positive" detections, especially if the SVM model is generated with an incomplete training dataset or if the one-class SVM algorithm used to identify the support vector boundary classifies one or more of the vectors in the training dataset as outliers. In such cases where the computed outlier measure of the real offending vector is much more significant than the false positives, the SVM model can effectively be adjusted by setting the bias or threshold adjustment term b to a level that prevents the relatively close "false positive" vectors from being classified as outliers while still detecting the true offending vector as an outlier.

Another approach for reducing false positives is to analyze the detected outliers and associated signals stored in the audit log 511. By combining the accumulated false positives into the training data set and re-training, the SVM model can be updated to include the new condition as within the "good behavior".

Yet another approach for improving the accuracy and precision of the model is to provide post-silicon training data set to create a better SVM model that is updated with signals that are captured during chip operation. For example, application-based vectors and/or computationally-intensive test vectors running in silicon can generate traces for extensive training to improve accuracy of the SVM model, resulting in the "good" space covered by the post-silicon traces being much larger. In selected embodiments, post-silicon training can be performed off-chip and off-line by monitoring signals during chip operation and routing the monitored signals off-chip to collect trace information which may be used to train a new SVM model. The new SVM model may be loaded on-chip to replace the old model in a secure firmware update fashion. In other embodiments, post-silicon training can be performed on-chip by routing monitored signals to on-chip memory in batches. Using a training engine that is executed as an application software on-chip, the monitored signals from on-chip memory are retrieved and applied as training data to update the SVM model, thereby enabling the SOC 500 to update the SVM model without requiring external firmware updates. With either off-chip or on-chip model updates, the product manufacturer can further refine the SVM model based on the trace generated by running their software. In this case, anomalies are found outside the space of the normal use of their software.

In selected embodiments of the present disclosure, the runtime classifier may be implemented in hardware as an SVM classifier circuit which is used to accelerate tasks involving vector computations, such as SVM classification. Those skilled in the art will recognize that vector computation engines may be readily implemented using high-level synthesis if performance is not a concern. In applications where there is performance requirement, there are many literatures describing how to efficiently implement SVM classifier circuits. Example hardware SVM classifiers are described in K. Irick et al., "A Hardware Efficient Support Vector Machine Architecture for FPGA," 16th International Symposium on Field-Programmable Custom Computing Machines, pp. 304-305 (2008) and Papadonikolakis et al., "A Novel FPGA-based SVM Classifier," Markos Papadonikolakis et al, 2010 International Conference on Field-Programmable Technology (FPT), pp. 283-286 (2010). Alternatively, FIGS. 6-7 provide conceptual descriptions of simpler SVM runtime classifier circuits.

Figure 6:
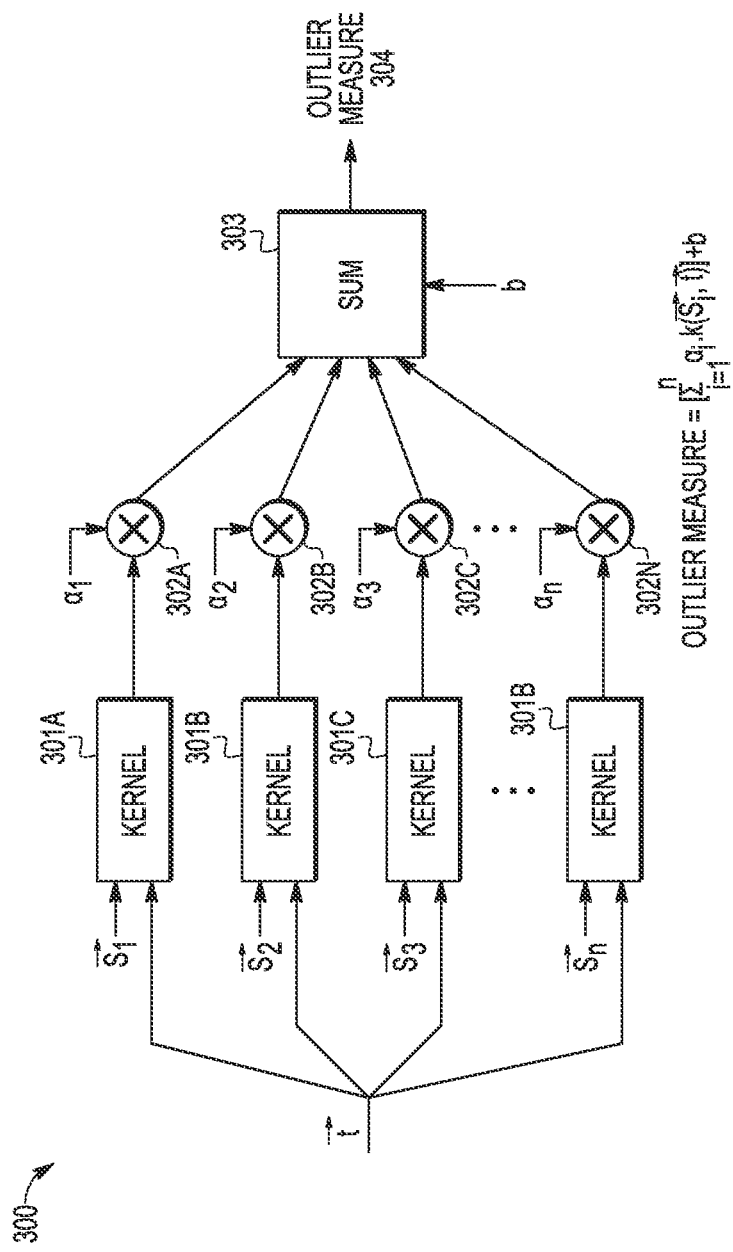
FIG. 6 illustrates a simplified circuit schematic diagram of an SVM classifier hardware circuit having a plurality of kernel blocks and multipliers to perform parallel computation operations for classification.

Turning now to FIG. 6, there is shown a simplified circuit schematic diagram of an SVM classifier hardware circuit 300 having a plurality of kernel blocks 301A-N and multipliers 302A-N connected in parallel to a summation unit 303 to perform runtime classification operations by computing an outlier measure 304. In the SVM classifier hardware circuit 300, a monitored security block signal vector t is applied in parallel to multiple hardware blocks 301A-N of kernel functions which are connected, respectively, to receive a corresponding support vector $s_i$ from the SV model. In selected embodiments, each kernel function block 301A-N computes the inner dot product of the monitored security block signal vector t and the corresponding support vector $s_i$. In addition, each kernel block 301A-N has a function output connected to a corresponding multiplier 302A-N for multiplication with the associated vector weight $\alpha_i$. The resulting products are combined at the summation unit 303 and then added with bias term b to generate an outlier measure output 304 which indicates whether the monitored security block signal vector t falls within the "good behavior" space captured by the model.

Figure 7:
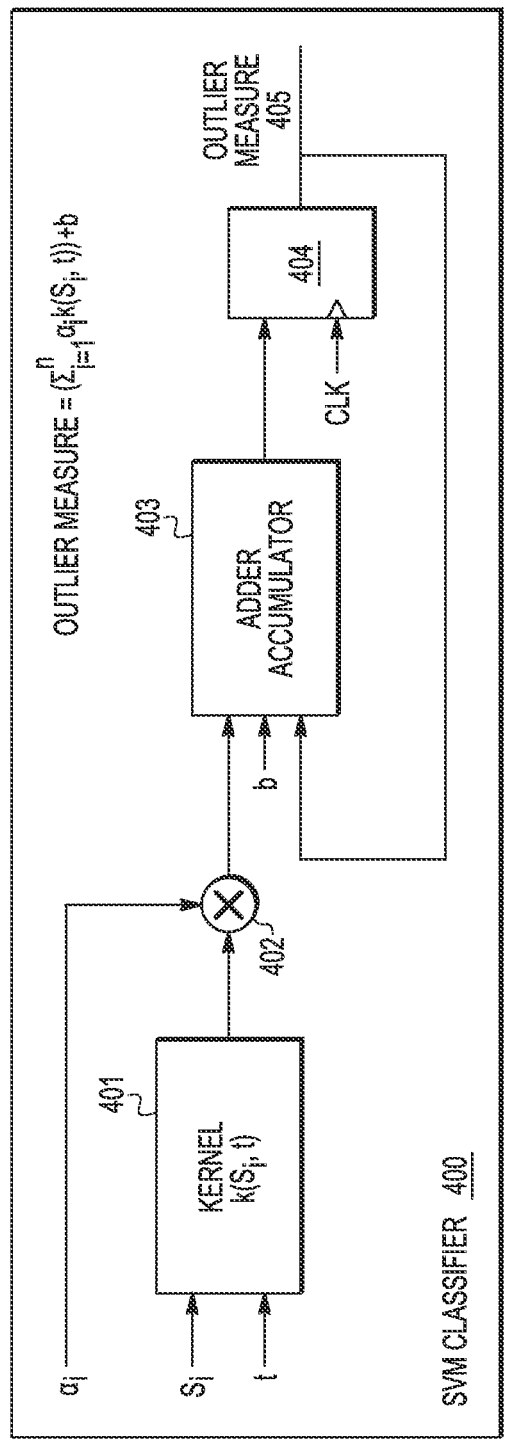
FIG. 7 illustrates a simplified circuit schematic diagram of an SVM classifier hardware circuit having a kernel block and multiplier circuit to perform pipelined computation operations for classification.

In FIG. 7, there is shown a simplified circuit schematic diagram of a supported vector model classifier hardware circuit 400 having a kernel hardware block 401 and multiplier circuit 402 which are connected to an adder or accumulator circuit 403 to perform pipelined classification operations for computing an outline measure 405. In the SVM classifier hardware circuit 400, the monitored security block signal vector t is applied to the kernel hardware block 401 which also sequentially receives the indexed support vectors $s_i$ from the SV model. Generally speaking, the kernel hardware block 401 computes the kernel function k as a function of the monitored security block signal vector t and the corresponding support vector $s_i$. For example, the kernel function block 401 may compute the inner dot product of the monitored security block signal vector t and the corresponding support vector $s_i$. At each iteration of an indexed support vector $s_i$, the kernel function output is multiplied with the associated vector weight $\alpha_i$ at the multiplier circuit 402, and the resulting output is accumulated with the current outlier measure value 405 in the accumulator unit 403 to compute the iterative sum $\Sigma_{i=1}^{n}\alpha_i k(s_i,t)$. At each iteration of the iterative sum $\Sigma_{i=1}^{n}\alpha_i k(s_i,t)$, the computational results generated by the accumulator unit 403 are captured at the output latch 404 (e.g., D flip-flop) under control of the clock signal CLK for output and feedback of the outliner measure 405, but the accumulator unit 403 does not accumulate the bias term b until the final computed iterative sum $\Sigma_{i=1}^{n}\alpha_i k(s_i,t)$ is calculated, at which point the adder/accumulator unit 403 adds the bias term b to compute the final outlier measure output 405 which indicates whether the monitored security block signal vector t falls within the "good behavior" space captured by the model.

Figure 8:
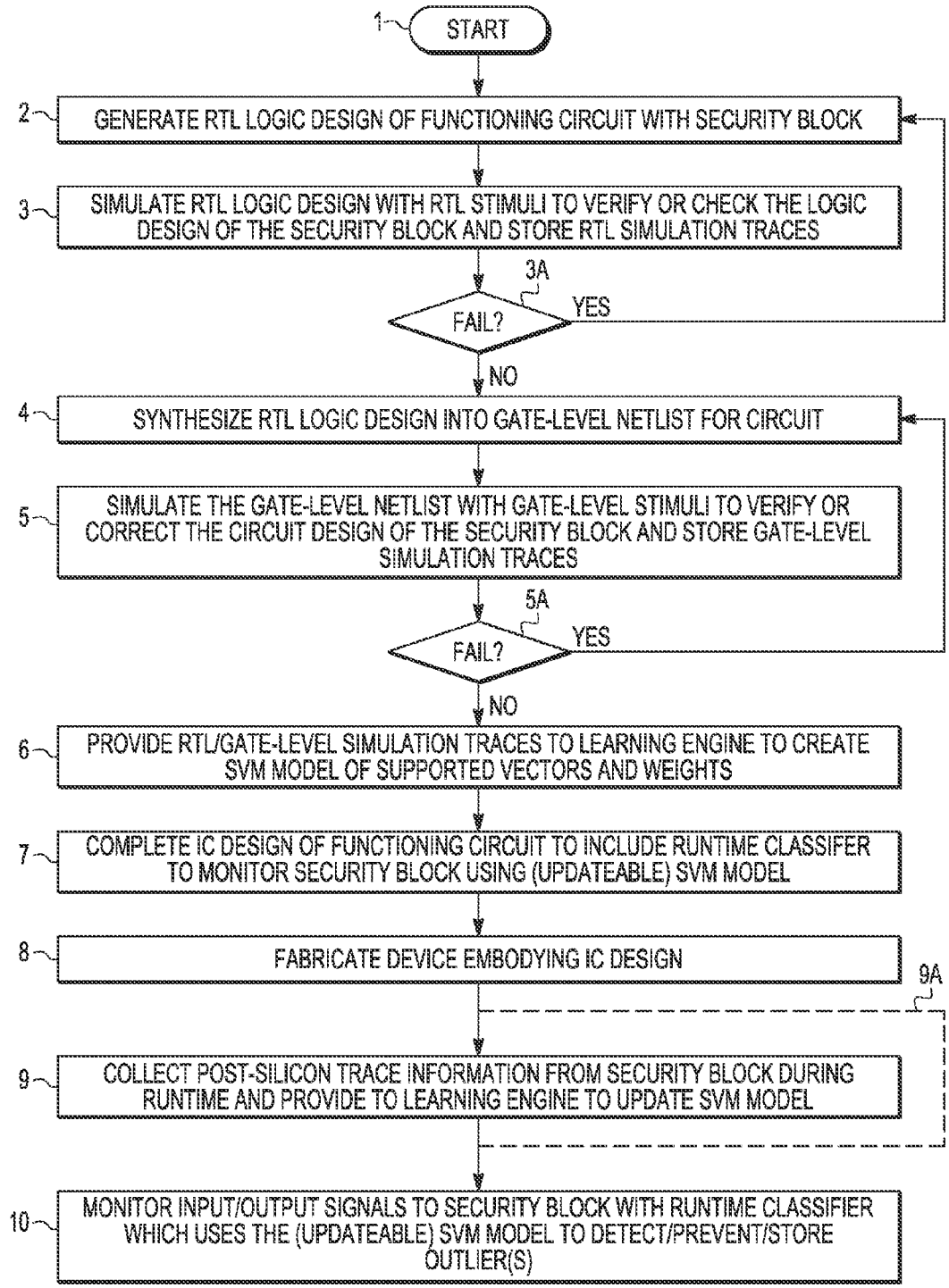
FIG. 8 illustrates a simplified flow chart for designing an integrated circuit device with a security model derived from pre-silicon verification data and/or post-silicon data in accordance with selected embodiments of the present invention.

To illustrate an example methodology for designing and using model-based runtime detection of insecure behavior, reference is now made to FIG. 8 which illustrates a simplified flow chart for designing an integrated circuit device with a security model derived from pre-silicon verification data. Once the method starts (step 1), a functioning circuit design for performing a specified logic function is generated which includes a security block or other protected circuitry (step 2). While any desired logic function may be designed, in an example implementation, the functioning circuit design may be an analog circuit (such as RFID), digital circuit (such as an automotive controller) or other microprocessor having one or more processor cores and a large on-chip integrated second-level cache, or combinations of analog sensors and digital circuits. The protected circuitry can be analog blocks (such as a power management unit, a phase locked loop), digital blocks (such as a crypto engine, a system mode controller) or mixed-signal blocks. As will be appreciated, the functioning circuit design flow step 2 may vary, depending on the type of integrated circuit being designed. For example, the functioning circuit design 2 for building an application specific integrated circuit (ASIC) may differ from a design 2 for designing a standard component or a general purpose microprocessor chip. In selected embodiments, the functioning circuit design may be provided as an input to a design process that is provided by an IP provider, a core design team, or other design company, or from other sources. The functioning circuit design may be provided in the form of an RTL description or other circuit schematic or other hardware-description language (HDL), such as Verilog, VHDL, or the like, and may be tangibly contained on one or more machine readable medium as human readable code.

At step 2, a circuit simulation step is performed to simulate the overall design, including the functioning circuit design and security block. While any desired circuit simulator may be used, in selected embodiments, a register-transfer level (RTL) function simulation unit conducts an RTL function simulation of the overall design by applying RTL stimuli to verify or check whether or not the expected IC function, including the security block function, can be obtained with the RTL description of the overall design. The RTL simulation results are stored as RTL simulation traces. If the circuit simulation of the overall design determines that the description of the functioning circuit design does not provide the expected function (affirmative outcome to fail test step 3a), then the method returns to the preceding step 2 to correct and revise the overall design. However, if the overall design passes the circuit simulation test (negative outcome to fail test step 3a), then the method performs a logic synthesis of the overall design.

At step 4, a netlist of the overall design is created. In selected example embodiments, a logic synthesizer may use an RTL description of the overall design to synthesize, or translate, the overall design into a netlist to define a list of wires, transistors, logic gates, control circuits, I/O, models, etc., that describe the connections to other elements and circuits in an integrated circuit design and recorded on at least one of machine readable medium. As will be appreciated, the netlist generation step 4 may be an iterative process in which the netlist is resynthesized one or more times depending on design specifications and parameters for the circuit. In addition, the design process at this stage may include a design for testing (DFT) step for inserting certain testability features to the IC design.

At step 5, a logic simulation step is performed to verify the logic of the netlist description of the overall design, including the security block and other circuit designs. While any desired logic simulator may be used, in selected embodiments, a verification technique (such as equivalence checking or model checking by evaluating the results from hand generated or random test patterns) can be used at step 5 to confirm and verify the logic of the netlist description. If the logic simulation of the overall design determines that circuit design does not provide the expected logic or timing function (affirmative outcome to fail test step 5a), then the method returns to the preceding step 4 to correct and revise the netlist description of overall design. However, if the overall design passes the logic simulation test (negative outcome to fail test step 5a), then the method generates an SVM model.

At step 6, an SVM model is generated for at least the security block portion of the IC design. While any of a variety of model generation techniques may be used, in selected embodiments, the RTL and relevant gate-level simulation traces captured from the simulation steps 3, 5 are provided to a learning engine to create an SVM model consisting of the support vectors and weights for the security block. By applying the RTL and associated gate-level simulation traces to train a machine learning engine, the resulting SVM model defines the "good behavior" of the security block by capturing the boundary of the space covered by training dataset. The SVM model is essentially the important samples on the boundary (support vectors) with associated weights.

At step 7, the IC design of functioning circuit is completed to include a runtime classifier to monitor the security block using the SVM model. In selected embodiments, the SVM classifier may be implemented in hardware which performs accelerated tasks involving vector computations. If desired, the completion of the IC design may include additional timing simulation and layout verification steps (not shown) to confirm that logic and timing requirements for the overall design including the runtime classifier are functioning properly.

At step 8, the device embodying the IC design, including the runtime classifier and SVM model are fabricated. For example, photomasks generated at step 7 may be used in various semiconductor fabrication steps to produce a semiconductor circuit or circuits embodying the overall design. As will be appreciated, conventional processing steps may be used to complete the fabrication of the IC design described herein. Thus, the specific sequence of steps used to complete the fabrication of the device components may vary, depending on the process and/or design requirements.

At step 9, the fabricated device may be activated or validated to collect post-silicon trace information from at least the security block during chip operation. The post-silicon trace information may be collected from real applications and operating system software running in silicon to generate additional traces for extensive training of the SVM model to improve accuracy. In selected embodiments, the collected post-silicon trace information may be routed off-chip and provided to a machine learning engine to update the SVM model which is then securely uploaded to the chip. In other embodiments, the collected post-silicon trace information may be stored on-chip and provided to a machine learning engine running on-chip to update the SVM model. As indicated with the dashed line 9A, step 9 may be skipped if desired.

At step 10, the input/output signals associated with the security block are monitored with the runtime classifier which uses the (updateable) SVM model to detect, prevent, and or record any outlier behavior. For example, the outlier detection process may use an SVM one-class algorithm to compute an outlier measure for each access to the security block. In this way, the SVM model can be used to decide whether a new sample falling in the space captured by the model or not.

By now it should be appreciated that there is provided herein a method and apparatus for implementing hardware security in an electronic device. In the disclosed methodology and apparatus, a support vector model is derived from verification data to define secure behavior for a first circuit (e.g., a security block) on the electronic device, and then stored within memory of the electronic device. In selected embodiments, the support vector model may include important samples capturing the boundary of the "good" space and associated weights derived from verification data to define secure behavior for the first circuit. For example, the support vector model may be derived from RTL simulation traces, or from RTL and gate-level trace verification data, for the first circuit which are applied as training data to a support vector machine (SVM) learning engine to generate the support vector model of security-adhering behavior for the first circuit. Using the support vector model, a runtime classifier hardware circuit on the electronic device monitors signals associated with the first circuit by comparing the signals to the support vector model, thereby detecting an outlier signal for the first circuit. In selected embodiments, the runtime classifier hardware circuit may be implemented in hardware as a support vector machine (SVM) classifier circuit having a plurality of kernel blocks and multipliers connected in parallel to perform runtime classification operations. In other embodiments, the runtime classifier hardware circuit may be implemented in hardware as a support vector machine (SVM) classifier circuit having a kernel block and a multiplier circuit connected to perform pipelined runtime classification operations. In operation, the signals associated with the first circuit may be monitored by comparing one or more of an input signal to and an output signal from the first circuit to the support vector boundary to detect the outlier signal for the first circuit. In addition, post-silicon simulation trace data may be applied to a support vector machine (SVM) learning engine to update the support vector model of security-adhering behavior for the first circuit. As a result, any detected outlier signal to the first circuit may be blocked, such as by preventing a first outlier input signal from being input to the first circuit and/or by blocking a first outlier output signal from the first circuit.

In another form, there is provided a non-transitory computer program product having executable program code that, when executed by signal processing logic, enables runtime classification of insecure behavior at a first circuit on a data processing system by performing defined actions. The defined actions include accessing a support vector model which is derived from verification data to define secure behavior for a first circuit on the data processing system. In selected embodiments, the support vector model is derived from simulation traces for the first circuit that are applied as training data to a support vector machine (SVM) learning engine to generate the support vector model of security-adhering behavior for the first circuit. The action of accessing the support vector model may include retrieving, from memory located on-chip with the data processing system, a support vector of boundary samples and associated weights defining secure behavior for the first circuit. The defined actions also include monitoring input signals to the first circuit with a runtime classifier on the data processing system which compares the input signals to the support vector model, thereby detecting an outlier input signal to the first circuit. The defined actions may also include monitoring output signals from the first circuit with runtime classifier circuit on the data processing system which compares the output signals to the support vector model, thereby detecting an outlier output signal to the first circuit. In selected embodiments, the runtime classifier may be implemented with a vector processing unit located on-chip with the data processing system or with an interrupt service routine executed by the data processing system. In monitoring input signals, the input signals may be compared to the support vector to detect the outlier input signal to the first circuit. The defined actions may also include applying post-silicon simulation trace data to a support vector machine (SVM) learning engine to update the support vector model of security-adhering behavior for the first circuit. Finally, the defined actions include blocking the outlier input or output signal to the first circuit.

In yet another form, there is provided an apparatus for detecting insecure behavior at a first circuit on a data processing system. The disclosed apparatus may include memory for storing a support vector model which is derived from simulation traces for the first circuit that are applied as training data to a support vector machine (SVM) learning engine to generate the support vector model of security-adhering behavior for the first circuit on the data processing system. The disclosed apparatus may also include a runtime classifier for monitoring input signals to the first circuit on the data processing system by comparing the input signals to the support vector model, thereby detecting an outlier input signal to the first circuit. In selected embodiments, the runtime classifier may be implemented as a vector processing unit located on-chip with the data processing system.

Various illustrative embodiments of the present invention have been described in detail with reference to the accompanying figures. While various details are set forth in the foregoing description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are depicted with reference to simplified block diagrams and flow charts illustrating design and operational details of a model-based runtime classification methodology and hardware for detecting insecure behavior for a computer system without including every device feature or aspect in order to avoid limiting or obscuring the present invention. Such descriptions and representations are used by those skilled in the art to describe and convey the substance of their work to others skilled in the art, and the omitted details which are well known are not considered necessary to teach one skilled in the art of how to make or use the present invention. Some portions of the detailed descriptions provided herein are also presented in terms of algorithms and instructions that operate on data that is stored in a computer memory. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that, throughout the description, discussions using terms such as "processing" or "computing" or "calculating" or "determining" or "displaying" or the like, refer to the action and processes of hardware or a computer system or a similar electronic computing device, that manipulates and transforms data represented as physical (electronic) quantities within registers and memories into other data similarly represented as physical quantities within the memories or registers or other such information storage, transmission or display devices.

Although the described exemplary embodiments disclosed herein are directed to a method and apparatus for designing and using a model-based runtime classifier to detect insecure behavior, the present invention is not necessarily limited to the example embodiments which illustrate inventive aspects of the present invention that are applicable to a wide variety of hardware, software, firmware, and/or microcode arrangements that may be used in order to manage data flow in a circular buffer. Thus, the particular embodiments disclosed above are illustrative only and should not be taken as limitations upon the present invention, as the invention may be modified and practiced in different but equivalent manners apparent to those skilled in the art having the benefit of the teachings herein. For example, although FIG. 1 and the discussion thereof describe an exemplary design flow sequence for deriving a security model derived from pre-silicon verification data, the illustrated design sequence is presented merely to provide a useful reference in discussing various aspects of the invention, and is not intended to be limiting so that persons of skill in the art will understand that the principles taught herein apply to other types of design environments. In addition, the system on chip 500 depicted in FIG. 5 may include other device components, and the SVM model may be stored in any type of computer-readable media. Examples of such media include random access memory (RAM), read-only memory (ROM), non-volatile random access memory (NVRAM), electrically erasable programmable read-only memory (EEPROM), flash memory, and the like. Though FIG. 5 shows the example embodiment in a system on chip, the runtime detector may also be implemented in systems on boards or in other suitable deployments. In addition, the disclosed functions of the training engine 210 may be implemented in software to read verification data and generate a model by executing the instructions of the computer-readable medium with one or more processors, discrete hardware circuitry, firmware, software executing on a programmable processor, or a combination of any of the above. Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. In addition, the term "coupled," as used herein, is not intended to be limited to a direct coupling or a mechanical coupling. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of implementing hardware security in an electronic device, comprising:
    deriving a support vector model to define secure behavior for a first circuit on the electronic device from verification data comprising register-transfer-level (RTL) simulation traces for the first circuit by applying the RTL simulation traces as training data to a support vector machine (SVM) learning engine to generate the support vector model of security-adhering behavior for the first circuit, storing, within a memory of the electronic device, the support vector model;
    monitoring signals associated with the first circuit with a runtime classifier hardware circuit on the electronic device which compares the signals to the support vector model to detect an outlier signal for the first circuit; and
    blocking the outlier signal from being input to or output from the first circuit.

2. The method of claim 1, further comprising deriving the support vector model from gate-level trace verification data for the first circuit by applying the gate-level trace verification data as training data to a support vector machine (SVM) learning engine to generate the support vector model of security-adhering behavior for the first circuit.

3. The method of claim 1, where the runtime classifier hardware circuit comprises a support vector machine (SVM) classifier hardware circuit comprising a plurality of kernel blocks and multipliers connected in parallel to perform runtime classification operations.

4. The method of claim 1, where the runtime classifier hardware circuit comprises a support vector machine (SVM) classifier hardware circuit comprising a kernel block and a multiplier circuit connected to perform pipelined runtime classification operations.

5. The method of claim 1, where the support vector model comprises a support vector of boundary samples and associated weights derived from verification data to define secure behavior for the first circuit.

6. The method of claim 5, where monitoring signals associated with the first circuit comprises comparing one or more of an input signal to and an output signal from the first circuit to the support vector boundary to detect the outlier signal for the first circuit.

7. The method of claim 1, further comprising applying post-silicon simulation trace data to a support vector machine (SVM) learning engine to update the support vector model of security-adhering behavior for the first circuit.

8. The method of claim 1, where blocking the outlier signal comprises preventing a first outlier input signal from being input to the first circuit.

9. The method of claim 1, where blocking the outlier signal comprises blocking a first outlier output signal from the first circuit.

10. A non-transitory computer program product having executable program code that, when executed by signal processing logic, enables runtime classification of insecure behavior at a first circuit on a data processing system by performing actions comprising:
    deriving a support vector model from register-transfer-level (RTL) simulation traces for the first circuit that are applied as training data to a support vector machine (SVM) learning engine to generate the support vector model of security-adhering behavior for the first circuit;

accessing a support vector model which is derived from verification data to define secure behavior for a first circuit on the data processing system;

monitoring input signals to the first circuit with a runtime classifier on the data processing system which compares the input signals to the support vector model to detect an outlier input signal to the first circuit; and blocking the outlier input signal to the first circuit.

11. The computer program product of claim 10, further comprising executable program code that, when executed by signal processing logic, performs actions comprising:

monitoring output signals from the first circuit with runtime classifier circuit on the data processing system which compares the output signals to the support vector model to detect an outlier output signal to the first circuit; and blocking the outlier output signal from the first circuit.

12. The computer program product of claim 10, where accessing the support vector model comprises retrieving, from memory located on-chip with the data processing system, a support vector of boundary samples and associated weights defining secure behavior for the first circuit.

13. The computer program product of claim 12, where the runtime classifier comprises a vector processing unit located on-chip with the data processing system.

14. The computer program product of claim 12, where the runtime classifier comprises an interrupt service routine executed by the data processing system.

15. The computer program product of claim 12, where monitoring input signals comprises comparing the input signals to the support vector to detect the outlier input signal to the first circuit.

16. The computer program product of claim 10, further comprising executable program code that, when executed by signal processing logic, performs actions comprising:

applying post-silicon simulation trace data to a support vector machine (SVM) learning engine to update the support vector model of security-adhering behavior for the first circuit.

17. An apparatus for detecting insecure behavior at a first circuit on a data processing system, comprising:

memory for storing a support vector model which is derived from register-transfer-level (RTL) simulation traces for the first circuit that are applied as training data to a support vector machine (SVM) learning engine to generate the support vector model of security-adhering behavior for the first circuit on the data processing system; and a runtime classifier for monitoring input signals to the first circuit on the data processing system by comparing the input signals to the support vector model to detect and block an outlier input signal to the first circuit.

18. The apparatus of claim 17, where the runtime classifier comprises a vector processing unit located on-chip with the data processing system.

* * * * *